United States Patent Office 3,844,995 Patented Oct. 29, 1974

3,844,995

DISPERSE (COLLOID) MIXTURES OF INORGANIC THICKENER AND POLYESTER RESIN

Werner Kloker, Krefeld-Bockum, and Johannes Beckers, Kempen, Germany, assignors to Bayer Aktiengesellschaft, Leverkusen, Germany No Drawing. Filed May 10, 1973, Ser. No. 358,845
Claims priority, application Germany, May 17, 1972, P 22 23 989.0
Int. Cl. C08g *51/04*
U.S. Cl. 260—22 CB 10 Claims

ABSTRACT OF THE DISCLOSURE

Colloidal mixtures of (a) about 10 to 80% by weight of organic thickeners for unsaturated polyester resins and
(b) about 90 to 20% by weight of a polyester from dicarboxylic acids and glycols, which contains co-condensed monocarboxylic acids and has an acid number of about 5 to 50 and an OH number of 100 to 300.

Mixtures of magnesium oxide and unsaturated polyester resin solutions in copolymerisable monomers are known from U.S. Patent Specification 2,628,209. Such mixtures, for example those from 1.5% of magnesium oxide and an unsaturated polyester (U.P.) having an acid number of 20, in styrene solution, on storage show a strong increase in viscosity which can rise to about 100 million cp. over the course of 7 to 14 days. From this, the industrially very important "resin mat technique" has developed (compare, on this subject, DIN 16,913). In this process, glass fibre mats, cut glass fibre rovings or glass fabrics are impregnated with a mixture of unsaturated polyester resins in styrene solution, fillers (for example kaolin, chalk or talc), organic peroxides (for example benzoyl peroxide or tert.-butyl perbenzoate) and an inorganic thickener, especially magnesium oxide. The sheet-like, still pasty, structure is rolled up between two polyethylene films, protected against light in aluminum foil and stored for some days to some months. After the mixture has reached a viscosity (a "degree of thickening") of about 10 million cp., it is possible, after removing the protective film, to press the "resin mat" in heated steel moulds with pressure of more than 100° C., to give mouldings.

Suitable inorganic thickeners, apart from magnesium oxide, are magnesium hydroxide, calcium oxide, cylcium hydroxide, zinc oxide, aluminates, titanates, aluminum oxides and its mixed oxides as well as mixtures of the products mentioned, and also Portland cement. The oxides and hydroxides of the elements of the 2nd and 3rd group of the periodic system are preferred, especially magnesium oxide.

The speed and degree of thickening largely depend on the type of treatment of the said metal oxides and hydroxides. Equally, the type of mixing of these products with the U.P. resin plays a role. A disadvantage is the possible reaction of the oxides or hydroxides with the carbon dioxide in air on storage. In order to achieve optimum wetting and reaction of the oxides and/or hydroxides with the U.P. resin it has proved necessary, in many cases, to grind the mixtures, if appropriate after addition of fillers, on a roll mill.

To avoid these uncertainties, simplify metering and facilitate mixing, various attempts have been made in the past to use the thickeners in the form of dispersions or pastes. Customary plasticisers, for example dioctyl phthalate, dimethylphthalate, dibutyl phthalate, dicyclohexyl phthalate, mixtures of the products mentioned and also phosphoric acid esters were employed as binders for such colloidal mixtures. However, such colloidal mixtures showed the disadvantage of low stability and relatively severe sedimentation.

It has now been found that colloidal (disperse) mixtures of the said thickeners, especially of oxides and/or hydroxides of the elements of the 2nd and 3rd group of the periodic system, with polyester resins (without copolymerisable monomers) having an acid number of 5 to 50, preferably 15 to 30, and an OH number of 100 to 300, preferably 150 to 270, do not display the disadvantages described above or display them to a far lesser degree.

Polyester resins in the present sense are condensation products of dicarboxylic acids and dialcohols (glycols). Possible dicarboxylic acids are: saturated, aliphatic, cycloaliphatic and aromatic dicarboxylic acids (for example succinic acid, orthophthalic acid, isophthalic acid, terephthalic acid, adipic acid, HET-acid, hexahydrophthalic acid and endomethylenetetrahydrophthalic acid) and, as unsaturated dicarboxylic acids, for example maleic acid, maleic anhydride, fumaric acid, itaconic acid, citraconic acid and tetrahydrophthalic acid. Suitable dialcohols (glycols) are: ethylene glycol, propylene glycol, 1,3-butanediol; 1,2-butanediol; 2,3-butanediol and 1,4-butanediol as well as neopentyl glycol, hexanediols (for example 1,6-hexanediol) and especially oligomers of ethylene oxide, propylene oxide and butene oxide, especially diethylene glycol, triethylene glycol, tetraethylene glycol and dipropylene glycol, tripropylene glycol and corresponding oligomers of the various butene oxides. Similarly to the dicarboxylic acids mentioned, the glycols mentioned can be employed as condensation components individually or as mixtures with one another. Furthermore it is possible to replace dicarboxylic acids to a limited degree (at most up to 10% by weight referred to the dicarboxylic acid used) by tricarboxylic and/or tetracarboxylic acids, for example trimellitic acid and benzenetetracarboxylic acid. Corresponding remarks apply to the replacement of dialcohols by polyhydric alcohols, for example glycerine, trimethylolpropane, pentaerythritol and sorbitol. the maximum amount of these higher-functional compounds is again 10% by weight referred to the dialcohols used.

According to a preferred embodiment, monocarboxylic acids are used conjointly in the manufacture of the polyester resins, in general in an amount of 0.3 to 1.8, preferably 0.8 to 1.2, mols per 1 mol of dicarboxylic acid, whilst the amount of glycols employed can be 1.0 to 1.5 mols per 1 mol of carboxylic acids. Possible saturated monocarboxylic acids are aliphatic, cycloaliphatic, aromatic and alkylaromatic carboxylic acids, for example $\alpha$-ethylhexanoic acid, stearic acid, coconut first runnings fatty acid, benzoic acid, hexahydrobenzoic acid and p-tert.-butyl benzoic acid. In combination with exclusively saturated dicarboxylic acids, the use of $\alpha,\beta$-ethylenically unsaturated monocarboxylic acids, for example acrylic acid and methacrylic acid, offers advantages. Polyesters in which such unsaturated carboxylic acids, especially acrylic acid and/or methacrylic acid, are co-condensed, do not cause any plasticising action when used as additives in polymerisable systems since they can be copolymerised when the systems are cured. Further examples of unsaturated monocarboxylic acids are crotonic acid, sorbic acid, oleic acid, soya oil fatty acids and ricinenic acid. Substituted monocarboxylic acids, for example ricinoleic acid and hydrogenated ricinoleic acid, are also of interest.

The colloidal mixtures in general contain about 10 to 80, preferably 30 to 60 percent by weight of thickeners of the type mentioned and about 90 to 20, preferably 70 to 40, percent by weight of the special polyesters mentioned.

Colloidal mixtures of 30 to 60% by weight of oxides and/or hydroxides of the 2nd and 3rd group of the periodic system, particularly magnesium oxide and/or magnesium hydroxide, and 70 to 40% by weight of an oligoester and/or polyester of maleic acid and/or fumaric acid, dipropylene glycol and ethylhexanoic acid having an acid number of between 5 and 50, preferably 15 to 30, and a hydroxyl number of between 100 and 300, preferably 150 to 270, have proved particularly valuable.

In addition to oxides and/or hydroxides of the 2nd and 3rd group of the periodic system and the special polyesters mentioned, the colloidal mixtures according to the invention can contain further additives, for example additives which influence the sedimentation and the thixotropy, and also dyestuffs and/or colored pigments. The thixotropy and sedimentation are above all influenced by highly disperse silicic acids, products of asbestos-like silicate structure, for example A 28 of Messr Degusa, hydrogenated castor oil, hydrogenated castor oil fatty acids, bentones and commercial products which contain such chemicals in a pure or mixed form.

Furthermore, such colloidal mixtures can contain organic and/or inorganic fillers in a fibrous and/or pulverulent form, for example types of kaolin, types of magnesium and calcium carbonate, quartz powder, asbestos powder, thermoplastic powders, for example polyethylene powders, and powders of other macromolecular crosslinked and non-crosslinked products, which are either completely insoluble or can be swollen to a greater or lesser extent. Examples of possible crosslinked macromolecular substances are ground thermosetting plastics, for example cured unsaturated polyester resin and cured melamine-formaldehyde and urea-formaldehyde resin. Fibrous fillers are, for example, cut glass fibre, asbestos fibres, "organic synthetic fibres" and natural fibres.

The preferred field of use of the colloidal mixtures according to the invention is their use for thickening unsaturated polyester resin solutions in copolymerisable monomers, for example in styrene and/or acrylates and/or methacrylates and/or styrene derivatives and/or allyl compounds for the manufacture of resin mats and compression-moulding compositions. Since such mixes must contain peroxides, preferably organic peroxides, in order to be processable to mouldings it can be appropriate already to incorporate the organic peroxides conjointly into the colloidal mixtures according to the invention. Examples of possible peroxides for resin mats and compression-moulding compositions are benzoyl peroxide, tert.-butyl perbenzoate, perketals and the like. The perketals are particularly advantageous. They show the greatest storage stability in the presence of basic products.

The "colloid mixtures according to the invention" are added to the unsaturated polyester resins in such amounts that the complete mixtures of unsaturated polyester, copolymerisable monomers and "colloid mixtures according to the invention" contain about 0.1 to 10% by weight, preferably 0.5 to 2.5% by weight, of inorganic "thickeners" such as magnesium oxide. The unsaturated polyesters for the "thickening" of which the colloidal mixtures according to the invention are used have an acid number of about 10 to 100, preferably about 10 to 40; they are obtained in a manner which is in itself known by condensation of approximately equimolar amounts of $\alpha,\beta$-ethylenically unsaturated dicarboxylic acids, such as maleic acid, fumaric acid, itaconic acid, citraconic acid and glycols, such as ethylene glycol, propylene glycol, diethylene glycol, dipropylene glycol, dibutylene glycol and higher oligomers of these glycols, and neopentyl glycol, a part of the $\alpha,\beta$-ethylenically unsaturated carboxylic acids being replaceable by saturated and/or unsaturated aliphatic or cycloaliphatic carboxylic acids or aromatic dicarboxylic acids, such as adipic acid, sebacic acid or phthalic acid. It is also possible to modify the polyesters by co-condensation of monohydric alcohols or monobasic acids. Furthermore, the polyesters can contain small amounts of co-condensed 3-hydric or polyhydric alcohols.

In the examples which follow, the parts indicated are parts by weight.

EXAMPLE 1

(Comparison Experiment)

An unsaturated commercially available polyester manufactured by esterification of 1,620 parts of ethylene glycol, 2,181 parts of 1,3-butylene glycol, 4,570 parts of phthalic anhydride and 1,629 parts of maleic anhydride (molar ratio of 0.55:0.51:0.65:0.35) until an acid number of 38 and a hydroxyl number of 70 was reached, is of such highly viscous consistency that it cannot be converted, mixed with magnesium oxide, into a usable paste.

If 65 parts of this resin are dissolved in 35 parts of styrene with the addition of 0.01 part of hyroquinone, a solution of viscosity 750 cp. at 20° C., according to DIN 53,015, is obtained.

If 1.5 parts of magnesium oxide (Marmag quality, Messrs Merck, San Francisco) are mixed into 98.5 parts of this unsaturated polyester resin solution, this mixture "thickens" over the course of one week. The viscosity rises to about 500,000 cp. This is inadequate for the manufacture of resin mats. Special U.P. resin solutions for this field of use show a thickening of more than 10 million cp. after the same time.

Though, in view of the thickening, the above U.P. resin would have to be considered suitable for the manufacture of magnesium oxide pastes, such is also not the case. With 30 to 60% by weight of magnesium oxide, a viscous mass which cannot be used for the manufacture of resin mats is obtained.

The addition of 70 parts of styrene to 100 parts of the above U.P. resin solution does not show any significant change. Whilst addition of methyl alcohol and/or ethyl alcohol in an amount of the order of magnitude of 10 to 15% by weight gives slight improvements, it does not yield a usable paste. If the content of alcohol is raised to about 25%, a colloidal mixture is obtained which is of acceptable consistency but is not stable and sediments very severely and is thus unusable for practical application.

EXAMPLE 2

(Comparison Experiment)

100 parts of the unsaturated polyester resin solution according to Example 1 are mixed with 100 parts of dioctyl phthalate, 20 parts of methanol and 220 parts of magnesium oxide (of the above quality). Whilst this mixture shows a usable consistency with regard to viscosity, the mixture has dilatant properties. The great disadvantage is that the magnesium oxide sediments in spite of the rise in viscosity during storage.

EXAMPLE 3

(Comparison Experiment)

Dibutyl phthalate of commercial quality, having an acid number and a hydroxyl number of less than 2 and a viscosity of about 20 cp. at 20° C., is mixed with magnesium oxide in the ratio of 7:3. Apart from the disadvantage that such a mixture introduces unnecessary amounts of plasticiser, which connot be built into the molecule during the curing of resin mats, the mixture shows the disadvantage of lower storage stability, that is to say sedimentation of the magnesium oxide.

An important disadvantage of the binders mentioned is the fact that for optimum wetting the magnesium oxide cannot merely be stirred in but must additionally be ground on a roll mill. The mixtures according to the invention do not show these disadvantages. The magnesium oxide can be stirred in with commercially available stirring equipment and a stable colloidal mixture is thus produced in a simple manner.

The examples which follow illustrate the invention.

The special solvent-free oligo-esters and/or polyesters are manufactured in known apparatuses suitable for esterification reactions and equipped with a stirrer, heating and cooling, temperature control, a device for passing an inert gas through the apparatus, and a distillate outlet.

The reactions are carried out by mixing the reactants and heating them to the reaction temperatures given subsequently, whilst passing an inert gas (for example nitrogen) through the mixture, until the desired values of the acid number, hydroxyl number and viscosity of the products have been reached. The viscosity is determined in cp. at 20° C. in accordance with DIN 53,016. Suitable customary esterification catalysts, which are in part described in the literature, can be added.

EXAMPLE 4

A mixture of 4,397 parts of ricinoleic acid, 224 parts of 1,2-propylene glycol, 3,753 parts of diethylene glycol and 1,626 parts of fumaric acid, corresponding to molar ratio of 1.0:02:2.4:0.95, is esterified at 180° C. until an acid number of 19, an OH number of 270 and a viscosity of 850 cp. are reached.

60 parts of this special polyester are mixed with 40 parts of magnesium oxide (of the above quality of Messrs MERCK, San Francisco). A disperse mixture results, which shows a viscosity of 8,960 cp. on the first day. The viscosity measured is 9,600 cp. after ten days, 9,200 cp. after eighteen days and 9,900 cp. after twenty-four days. The colloidal mixture shows a remarkable constancy of the viscosity, and practically no sedimentation.

EXAMPLE 5

A mixture of 2,474 parts of benzoic acid, 5,682 parts of dipropylene glycol and 1,844 parts of succinic anhydride, corresponding to a molar ratio of 1.1:2:3:1:0, is esterified at 200° C. until an acid number of 28 is reached. The viscosity is then 1,840 cp. and the hydroxyl number 155. The colloidal mixture of 40 parts of magnesium oxide (of the above quality) and 60 parts of this binder gives a storage stable mixture.

EXAMPLE 6

A mixture of 2,442 parts of a natural coconut first runnings fatty acid having an acid number of 360, 5,593 parts of dipropylene glycol, 1,193 parts of maleic anhydride and 772 parts of phthalic anhydride, corresponding to a molar ratio of 0.9:2.4:0.7:0.3, is esterified at 190° C. until an acid number of 23 is reached, at which point the viscosity reached is 720 cp. and the hydroxyl number is 175. A combination of 40 parts of magnesium oxide and 60 parts of this binder gives a storage-stable suspension which shows no sedimentation.

EXAMPLE 7

A reaction mixture of 2,536 parts of α-ethylhexanoic acid, 5,706 parts of dipropylene glycol and 1,738 parts of maleic anhydride, corresponding to a molar composition of 1.0:2.4:1.0 mol, is heated to 200° C. over the course of 8 hours whilst passing an inert gas through it and is esterified at this temperature until an acid number of 22 and a viscosity of 380 cp. is reached. The product has a hydroxyl number of 200.

900 g. of this binder are initially introduced into a 2 litre polyethylene beaker and 600 g. of magnesium oxide are sprinkled in whilst stirring at half speed with a four-bladed stirrer (diameter 90 mm.).

After incorporation of the entire magnesium oxide, the mixture is dispersed for 10 minutes at full speed (about 1,400 revolutions per minute). The mixture has a viscosity of 8,320 cp. on the first day. After nine days the viscosity has risen to 9,920 cp. After three weeks the mixture, filled into 100 ml. measuring cylinders, shows no sedimentation of the magnesium oxide.

EXAMPLE 8

100 parts of a commercially available U.P. resin for resin mats [a solution of 35 parts of styrene and 65 parts of a condensation product of 2 mols of phthalic anhydride, 8 mols of maleic anhydride, 5 mols of ethylene glycol and 5 mols of 1,3-butylene glycol (acid number 15 to 20, OH number 20 to 40)] are ground with 1.5% by weight of magnesium oxide (Marmag) on a roll mill. This mixture shows a viscosity of 52,800 cp. after two days, 400,000 cp. after three days and 15.7 million cp. after seven days, at 20° C. In comparison thereto, 100 parts of the U.P. resin are mixed. with stirring, with 3.75 parts of the magnesium oxide paste mentioned, corresponding to an MgO content of 1.5 parts, and the thickening is measured from the rise in viscosity; it is 76,800 after two days, 496,000 after three days and 18.2 million cp. after seven days. This shows that the pastes according to the invention are superior to the conventional incorporation of magnesium oxide on a roll mill, with regard to simplicity, economy and speed of thickening.

What we claim is:

1. A thickening agent for unsaturated polyester resins, said thickening agent comprising a colloidal mixture of
- (a) from 10 to 80% by weight of an inorganic thickener selected from the group consisting of oxides and hydroxides of the elements of the second and third groups of the Periodic Table and
- (b) from 90 to 20% by weight of a polyester consisting of the condensation product of at least one dicarboxylic acid, at least one monocarboxylic acid, up to 10 %by weight, based on the weight of dicarboxylic acid, of at least one member selected from the group consisting of tricarboxylic acids and tetracarboxylic acids, and at least one glycol, said polyester having an acid number of from 5 to 50 and a hydroxyl number of from 100 to 300.

2. The thickening agent for unsaturated polyester resins according to claim 1 in which the polyester of component (b) has an acid number of from 15 to 30 and a hydroxyl number of from 150 to 270.

3. The thickening agent for unsaturated polyester resins according to claim 1 in which the polyester of component (b) is the condensation product of an α,β-ethylenically unsaturated dicarboxylic acid, a monocarboxylic acid and a dimeric or oligomeric glycol.

4. The thickening agent for unsaturated polyester resins according to claim 1 in which the molar ratio of monocarboxylic acid to dicarboxylic acid for component (b) is from 0.3:1 to 1.8:1.

5. The thickening agent for unsaturated polyester resins according to claim 1 in which the molar ratio of glycol to dicarboxylic acid for component (b) is from 1:1 to 1.5:1.

6. The thickening agent for unsaturated polyester resins according to claim 1 consisting of a colloidal mixture comprising from 30 to 60% by weight of component (a) and from 70 to 40% by weight of component (b).

7. The thickening agent for unsaturated polyester resins according to claim 1 in which component (a) is magnesium oxide or magnesium hydroxide.

8. A method of thicekning a solution of an unsaturated polyester in a copolymerizable monomer which comprises adding to said solution the thickening agent of claim 1.

9. A polyester solution comprising an unsatruated polyester dissolved in a copolymerizable monomer admixed wtih the thickening agent of claim 1.

10. A cured polyester composition comprising the cured polyester solution of claim 9.

(References on following page)

References Cited

UNITED STATES PATENTS

| | | | |
|---|---|---|---|
| 3,766,129 | 10/1973 | Pesez | 260—863 |
| 3,434,987 | 3/1969 | Dhein et al. | 260—21 |
| 2,628,209 | 2/1953 | Fisk | 260—861 |
| 3,631,217 | 12/1971 | Rabenold | 260—863 |
| 3,740,372 | 6/1973 | Baum et al. | 260—863 |
| 3,223,658 | 12/1965 | Kraft et al. | 260—22 M |
| 3,390,205 | 6/1968 | Schnell et al. | 260—863 |
| 3,536,642 | 10/1970 | Williger | 260—863 |

DONALD E. CZAJA, Primary Examiner

R. W. GRIFFIN, Assistant Examiner

U.S. Cl. X.R.

117—126 GB, 126 AB; 260—40 R, 861, 863